US012626448B2

(12) United States Patent
Kern et al.

(10) Patent No.: US 12,626,448 B2
(45) Date of Patent: May 12, 2026

(54) DISCRETE ROTATIONS FOR ORIENTED BOUNDING BOXES BASED ON PLATONIC SOLIDS

(71) Applicant: Advanced Micro Devices, Inc., Santa Clara, CA (US)

(72) Inventors: Michael Alexander Kern, Munich (DE); Matthäus G. Chajdas, Munich (DE); Daniel James Skinner, Milton Keynes (GB)

(73) Assignee: Advanced Micro Devices, Inc., Santa Clara, CA (US)

( * ) Notice: Subject to any disclaimer, the term of this patent is extended or adjusted under 35 U.S.C. 154(b) by 25 days.

(21) Appl. No.: 18/539,852

(22) Filed: Dec. 14, 2023

(65) Prior Publication Data

US 2025/0200864 A1    Jun. 19, 2025

(51) Int. Cl.
*G06T 15/06* (2011.01)
*G06T 19/20* (2011.01)

(52) U.S. Cl.
CPC ............. *G06T 15/06* (2013.01); *G06T 19/20* (2013.01); *G06T 2210/12* (2013.01); *G06T 2210/21* (2013.01); *G06T 2219/2016* (2013.01)

(58) Field of Classification Search
CPC ....... G06T 15/06; G06T 15/08; G06T 15/005; G06T 15/10; G06T 15/80; G06T 17/005; G06T 17/05; G06T 17/10; G06T 17/20; G06T 19/20; G06T 2210/12; G06T 2210/21; G06T 2219/2016
See application file for complete search history.

(56) References Cited

U.S. PATENT DOCUMENTS

| | | | | |
|---|---|---|---|---|
| 10,049,488 | B2 * | 8/2018 | Lee | G06T 15/06 |
| 10,839,475 | B2 * | 11/2020 | Benthin | G06F 9/3877 |
| 11,854,138 | B2 * | 12/2023 | Chajdas | G06T 17/005 |
| 12,079,919 | B2 * | 9/2024 | Oldcorn | G06T 11/20 |
| 2019/0318445 | A1 | 10/2019 | Benthin et al. | |
| 2021/0166462 | A1 | 6/2021 | Leonardi | |
| 2022/0020200 | A1 | 1/2022 | Fenney | |
| 2023/0097562 | A1 | 3/2023 | Shkurko et al. | |
| 2023/0099806 | A1 | 3/2023 | Oldcorn et al. | |
| 2025/0200865 | A1 * | 6/2025 | Gruen | G06T 17/20 |

OTHER PUBLICATIONS

Schneider, P. J. & Eberly, D. H., "Oriented Bounding Box", Geometric Tools for Computer Graphics, Science Direct, 2003, 22 pgs., downloaded from: https://www.sciencedirect.com/topics/computer-science/oriented-bounding-box on Sep. 29, 2021.

* cited by examiner

*Primary Examiner* — Vijay Shankar
(74) *Attorney, Agent, or Firm* — Volpe Koenig

(57) ABSTRACT

A technique for performing ray tracing operations is provided. The technique includes arriving at a bounding box of a bounding volume hierarchy ("BVH") having an orientation defined based on a platonic solid; testing a ray for intersection with the bounding box; and continuing traversal of the BVH based on results of the testing.

18 Claims, 7 Drawing Sheets

800

100

Interconnect 112

Processor 102

Auxiliary Device(s) 106

Auxiliary Processor(s) 114

APD 116

IO Devices 117

Memory 104

Storage 108

402

404

502

504

508

506

| Input Data 602 | → | Bounding Volume Hierarchy Buider 600 | → | Bounding Volume Hierarchy with Oriented Bounding Box(es) 604 |

DISCRETE ROTATIONS FOR ORIENTED BOUNDING BOXES BASED ON PLATONIC SOLIDS

BACKGROUND

Ray tracing is a rendering technique that generates an image using simulated light rays. Improvements to ray tracing techniques are constantly being made.

BRIEF DESCRIPTION OF THE DRAWINGS

A more detailed understanding can be had from the following description, given by way of example in conjunction with the accompanying drawings wherein.

DETAILED DESCRIPTION

A technique for performing ray tracing operations is provided. The technique includes arriving at a bounding box of a bounding volume hierarchy ("BVH") having an orientation defined based on a platonic solid; testing a ray for intersection with the bounding box; and continuing traversal of the BVH based on results of the testing.

Figure 1:
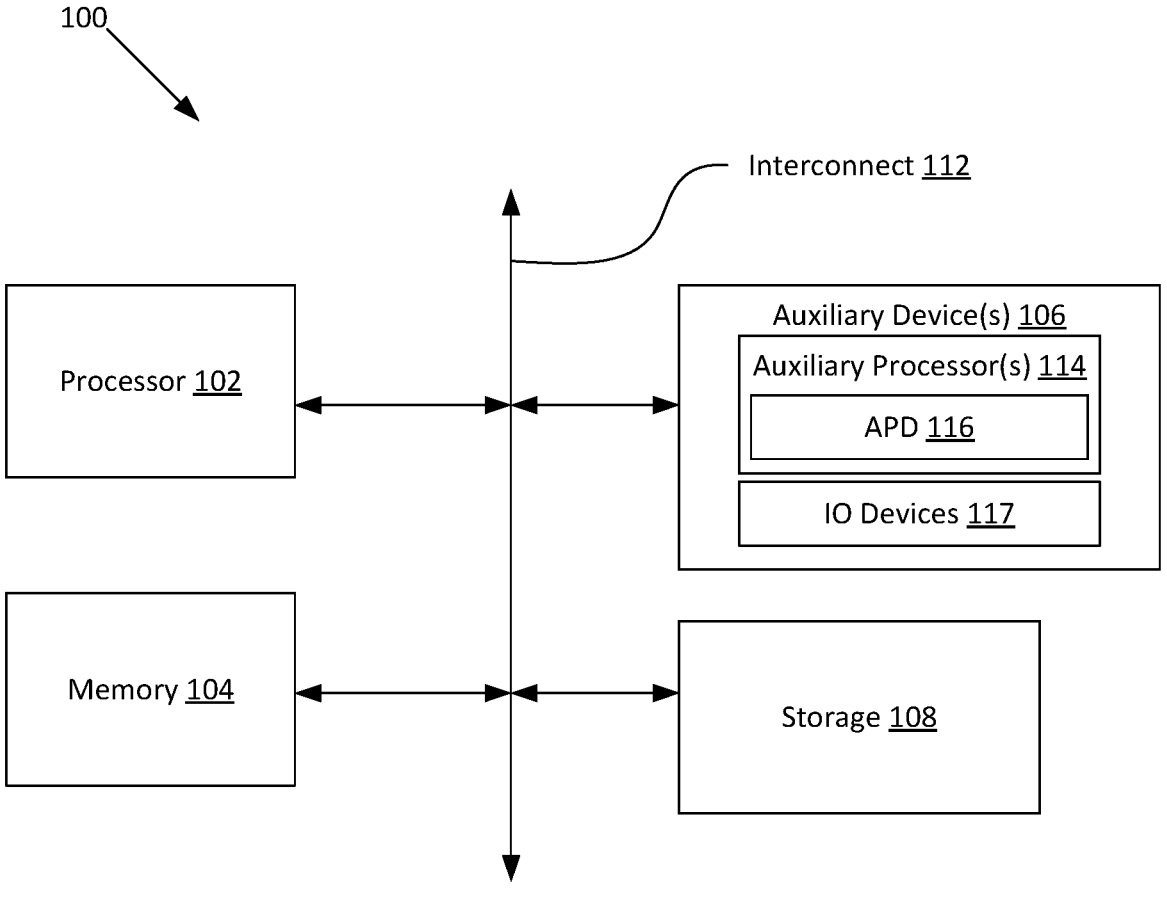
FIG. 1 is a block diagram of an example device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the memory 104, the one or more auxiliary devices 106, and the storage 108.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more auxiliary devices 106 includes an accelerated processing device ("APD") 116. The APD 116 may be coupled to a display device, which, in some examples, is a physical display device or a simulated device that uses a remote display protocol to show output. The APD 116 is configured to accept compute commands and/or graphics rendering commands from processor 102, to process those compute and graphics rendering commands, and, in some implementations, to provide pixel output to a display device for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and, optionally, configured to provide graphical output to a display device. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm perform the functionality described herein.

The one or more IO devices 117 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display device, a speaker, a printer, a haptic feedback device, one or more lights, an antenna, or a network connection (e.g., a wireless local area network card for transmission and/or reception of wireless IEEE 802 signals).

Figure 2:
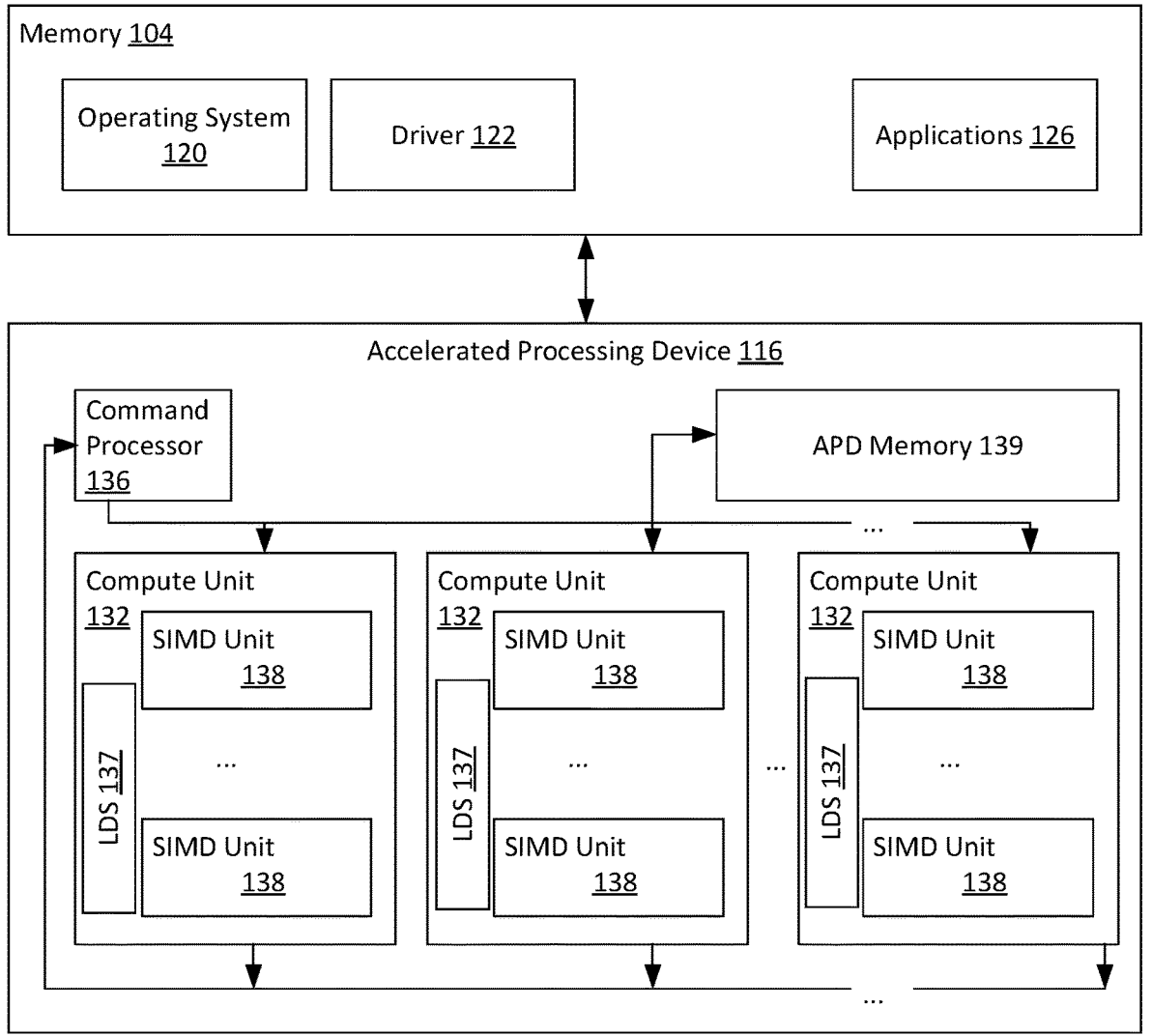
FIG. 2 is a block diagram of the device of FIG. 1, illustrating additional detail, according to an example.

FIG. 2 is a block diagram of the device 100, illustrating additional details related to execution of processing tasks on the APD 116, according to an example. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. Each compute unit 132 includes a local data share ("LDS") 137 that is accessible to wavefronts executing in the compute unit 132 but not to wavefronts executing in other compute units 132. A global memory 139 stores data that is accessible to wavefronts executing on all compute units 132. In some examples, the local data share 137 has faster access characteristics than the global memory 139 (e.g., lower latency and/or higher bandwidth). Although shown in the APD 116, the global memory 139 can be partially or fully located in other elements, such as in system memory 104 or in another memory not shown or described. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. In some examples, wavefronts are the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline (e.g., custom operations performed to supplement processing performed for operation of the graphics pipeline). An application 126 or other software executing on the processor 102 transmits programs that define such computation tasks to the APD 116 for execution.

Figure 3:
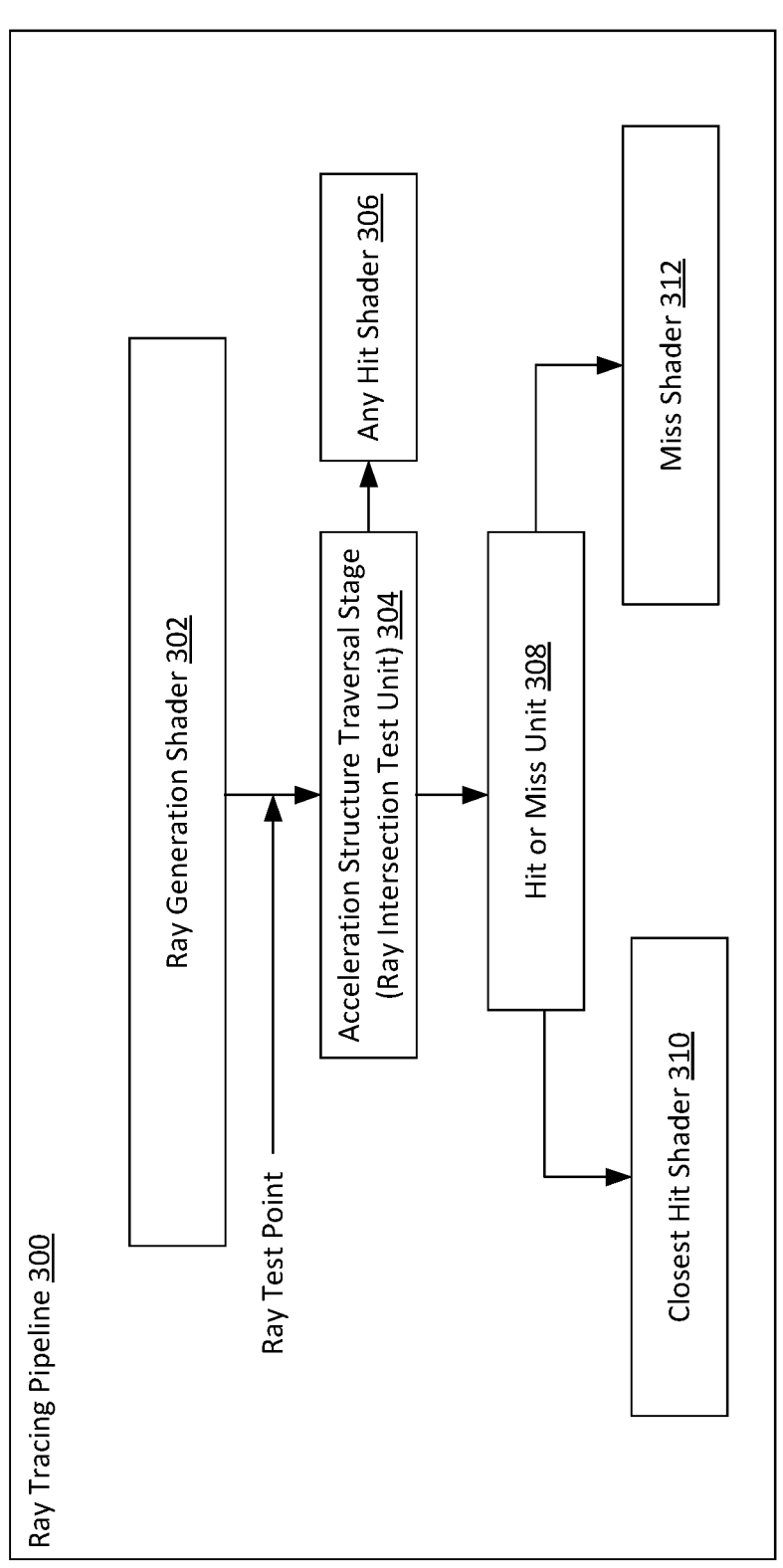
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is precompiled by an application compiler and/or compiled by the driver 122). The acceleration structure traversal stage 304 performs a ray intersection test to determine whether a ray hits a triangle.

The various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 may be orchestrated partially or fully in software or partially or fully in hardware, and may be orchestrated by the processor 102, the scheduler 136, by a combination thereof, or partially or fully by any other hardware and/or software unit. The term "ray tracing pipeline processor" used herein refers to a processor executing software to perform the operations of the ray tracing pipeline 300, hardware circuitry hard-wired to perform the operations of the ray tracing pipeline 300, or a combination of hardware and software that together perform the operations of the ray tracing pipeline 300.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For triangles that are hit, the ray tracing pipeline 300 triggers execution of an any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers execution of a closest hit shader 310 for the triangle closest to the origin of the ray that the ray hits, or, if no triangles were hit, triggers a miss shader.

Note, it is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. In some examples, rendering a scene involves casting at least one ray for each of a plurality of pixels of an image to obtain colors for each pixel.

It is possible for any of the any hit shader 306, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent different axis aligned bounding boxes cover different portions of the entire region. Each of those two children has two child nodes that represent axis aligned bounding boxes that subdivide the space of their parents, and so on. Leaf nodes represent a triangle against which a ray test can be performed. It should be understood that where a first node points to a second node, the first node is considered to be the parent of the second node.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
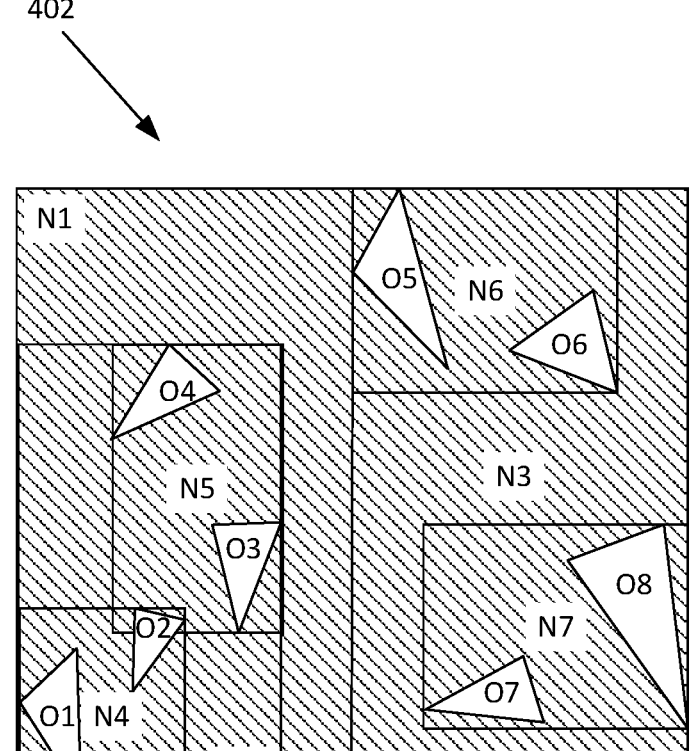
FIG. 4 is an illustration of a bounding volume hierarchy ("BVH"), according to an example.
Figure 4:
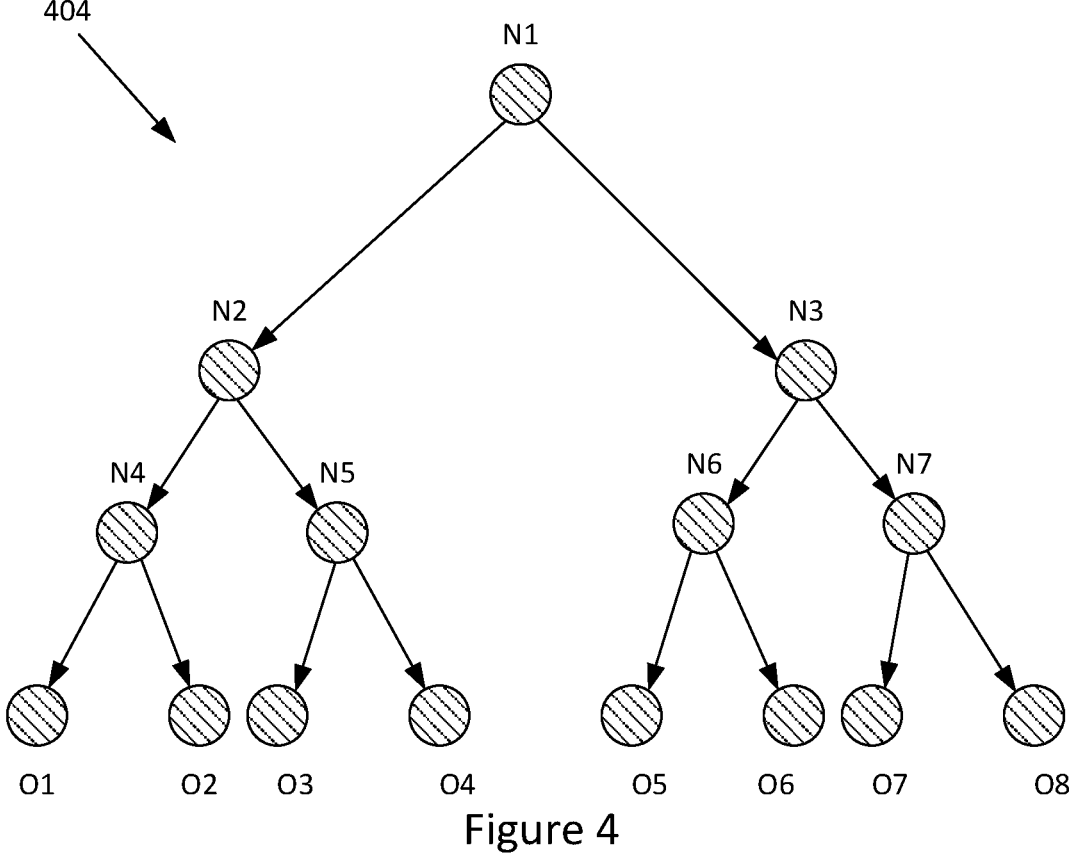

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node.

In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that No succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

As stated elsewhere herein, a ray intersection test involves traversing an acceleration structure such as a bounding volume hierarchy. This traversal encounters bounding box nodes, which are nodes having associated bounding boxes that bound all the geometry of the children. To allow efficiency and simplicity in both box node representation in memory and during intersection test, bounding boxes are sometimes defined as being axis aligned. The intersection test is simplified in this situation because such bounding boxes are defined by sides having constant values in each dimension and there is no need to expend storage on axis alignment. However, axis-aligned bounding boxes have the drawback that poorly matching underling geometry will result in inefficiencies resulting from unnecessary additional bounding volume hierarchy traversal.

Figure 5:
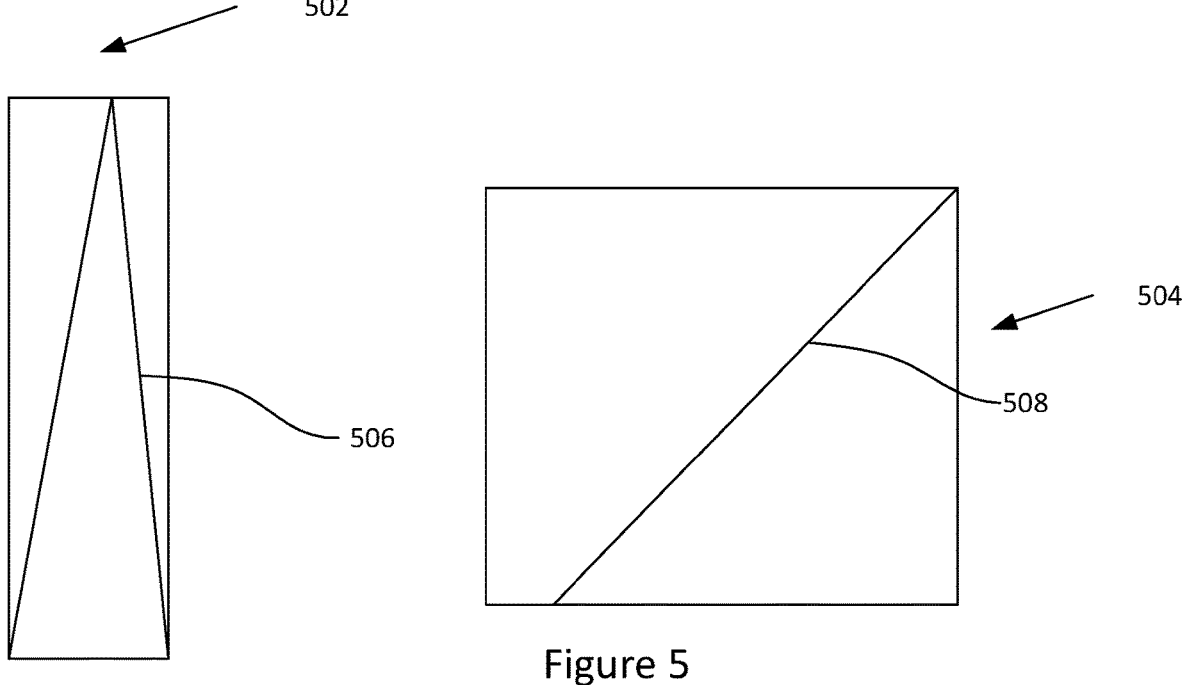
FIG. 5 illustrates an example well-fit bounding box and an example poorly-fit bounding box.

FIG. 5 illustrates an example well-fit bounding box 502 and an example poorly-fit bounding box 504. A first triangle 506 is illustrated within the well-fit bounding box 502 and a second triangle 508 is illustrated within the poorly-fit bounding box 504. For clarity, note that in the figure, the illustrated second triangle 508 has bottom vertices that align with the bottom edge of the bounding box and thus the bottom edge of the triangle 508. The well-fit bounding box 502 is considered well-fit because a large amount of the space within the bounding box 502 is filled by the triangle 506 within that bounding box 502. By contrast, the poorly-fit bounding box 504 is considered poorly-fit because the triangle 508 within the bounding box 504 fills a very small amount of space of the bounding box 504. Poorly-fit bounding boxes can negatively impact performance because hits within poorly-fit bounding boxes that do not hit any underlying triangles are more common than hits within well-fit bounding boxes that do not hit any underlying triangles. The chance of a hit is directly related to the ratio of a box volume to triangle surface area. Note that the two-dimensional diagram provided does not illustrate how much empty space there can be in a three-dimensional bounding box—there can be a much greater amount of such empty space in a three-dimensional bounding box. In addition, with a relatively large number of poorly fit bounding boxes, there is a greater chance that bounding boxes overlap (since bounding boxes must bound the interior geometry), which represents a degree of inefficiency. Hits within bounding boxes that do not hit any underlying triangles result in inefficiencies—it would be advantageous to stop traversal down a branch of a bounding volume hierarchy as early as possible if there are no triangles in that branch that are hit by the ray.

Poorly-fit bounding boxes can occur in the situation that bounding boxes can only be axis-aligned. An improvement includes "orienting" the bounding boxes by generating a rotated bounding box for rotated geometry to improve fit. In various implementations, an oriented bounding box is embodied within a bounding volume hierarchy 404 as information including an orientation, as well as the bounds of the oriented bounding box. This orientation can be thought of as defining a rotated coordinate system that is rotated with respect to a global coordinate system (e.g., the coordinate system at the top node of the bounding volume hierarchy) in one or more axes, or is rotated with respect to some other coordinate system, such as the coordinate system of a parent node or in the case of a bottom-level acceleration structure, orientation that is rotated with respect to a top-level acceleration structure. Bottom-level and top-level acceleration structures are components of a two-level acceleration structure. A two-level acceleration structure includes a top-level acceleration structure and one or more bottom-level acceleration structures. One or more box nodes of the top-level acceleration structure point to one or more bottom-level acceleration structures, in lieu of the explicit data being included within the top-level acceleration structure. This scheme allows bottom-level acceleration structures to be "instanced," which reduces the total amount of data that needs to be stored in the two-level acceleration structure. More specifically, by allowing nodes of the top-level acceleration structures to include pointers to bottom-level acceleration structures, the data of those bottom-level acceleration structures can be represented in the two-level acceleration structure twice without actually including the data twice. Traversal through the two-level acceleration structure would occur by following a pointer from a box node of a top-level acceleration structure to bottom-level acceleration structures when those pointers occur and where the intersection test for the box node succeeds. By allowing for the option to use oriented bounding boxes, bounding boxes can be better fit to badly rotated geometry, improving performance.

In operation, as the acceleration structure traversal stage 304 traverses the bounding volume hierarchy, if an oriented bounding box is encountered, the acceleration structure traversal stage 304 rotates the ray to be in the coordinate system of the oriented bounding box and performs the bounding box test for the ray against the box. In some implementations, rotation "accumulates" if multiple oriented bounding boxes exist in the same ancestor chain during traversal. In one example, an oriented bounding box is encountered which results in the acceleration structure traversal stage 304 rotating the ray. A test against that oriented bounding box indicates a hit. Subsequently, the acceleration structure traversal stage 304 encounters a child of that oriented bounding box which is further rotated. The acceleration structure traversal stage 304 further rotates the ray based on the rotation of this child object. In other implementations, each bounding box that is an oriented bounding box has orientation information that represents orientation with respect to world coordinates or with respect to the orientation of the base of the bounding volume hierarchy.

While a bounding box orientation expressed as three floating point numbers each defining rotation in a different one of three dimensions, can improve some aspects of performance, such an implementation introduces costs. Specifically, each orientation requires a certain amount of data to specify the rotation in each angle. If the rotation is represented, for example, as a 32-bit floating point number, the additional data required for three such values for a bounding box can be considered substantial. In addition, the processing associated with rotating the ray based on this data is not insubstantial. In an example, applying the rotation involves generating a rotation matrix, which is not a trivial operation and can involve performing sine and cosine operations, which are expensive, and performing matrix multiplication of a rotation matrix with the vector describing the ray, which is also not a trivial operation. With possible rotation in three dimensions, where the rotation in each dimension is represented with a number with a relatively large number of bits, such a matrix multiplication operation can be considered a substantial operation.

For at least the above reasons, techniques are disclosed herein whereby the orientation for oriented bounding boxes is quantized. That is, the number of ways in which a box node is able to be rotated is limited to a small set of possible orientations. The reduction in possible orientations as compared with an approach in which orientation is represented with a large amount of data such as 32 or 64 bits per dimension provides several benefits, such as reducing the amount of data that is required to be stored for the oriented bounding boxes and reducing the complexity of the hardware for applying the orientation of the oriented bounding box to the ray. The amount of data required to be stored is reduced as compared with an implementation that uses more orientation data because the reduced number of possible rotations can be represented with a smaller amount of data.

Figure 6:
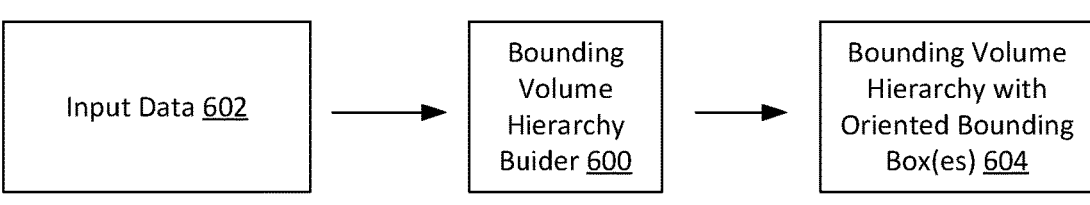
FIG. 6 illustrates techniques for generating a bounding volume hierarchy having oriented bounding boxes, according to an example.

FIG. 6 illustrates techniques for generating a bounding volume hierarchy having oriented bounding boxes, according to an example. A bounding volume hierarchy builder 600 processes input data 602 to generate a bounding volume hierarchy with one or more oriented bounding boxes 604. In some examples, the input data 602 is a previously built bounding volume hierarchy with or without oriented bounding boxes. In other examples, the input data 602 is geometry such as triangles or other geometry from which the bounding volume hierarchy builder 600 builds the bounding volume hierarchy with one or more oriented bounding boxes 604. The oriented bounding boxes are quantized according to one or more quantization schemes as described elsewhere herein.

The bounding volume hierarchy builder 600 generates the bounding volume hierarchy with oriented bounding boxes 604 according to any technically feasible technique. In some examples, the bounding volume hierarchy builder 600 recursively subdivides the scene geometry to generate bounding boxes for the various levels of the hierarchy. For each such level, the bounding volume hierarchy builder 600 generates candidate subdivisions, where each such candidate subdivision represents a manner in which the volume being considered is divided into bounding boxes. The volume being considered is the volume bounded by the bounding box of the node for which children are being generated for the next level. In an example, the plane of x=0 divides the volume for the level into two volumes. All triangles to one side of the plane are assigned to one bounding box and all triangles to the other side of the plane are assigned to another bounding box. In some examples, other candidate subdivisions are created using the y=0 plane and the z=0 plane. Although an example with axis-aligned planes is described, it should be understood that the candidate subdivisions may be generated in any technically feasible manner. It should be noted that although these planes are used to generate the bounding boxes, the bounding boxes do not necessarily directly align with these planes. Instead, the bounding boxes bound the geometry within each subdivided volume. Thus in some examples, the bounding boxes are sized to the extents of the triangles enclosed within the bounding boxes.

In some examples, in addition to defining the candidate subdivisions based on geometric split, each candidate subdivision includes an orientation for each of the bounding boxes. The orientation specifies rotation along one or more of the axes, where the amount of the rotation is quantized as described elsewhere herein. Thus for any particular level, the bounding volume hierarchy builder 600 generates multiple candidate subdivisions for any particular geometric subdivision, where each such candidate subdivision has a different set of bounding box orientations. In an example, for the geometric subdivision in which the plane of x=0 divides the volume two bounding boxes are generated, one for each side of the plane. The bounding volume hierarchy builder 600 generates multiple candidate subdivisions, each of which has a different orientation applied to one or both of the bounding boxes generated.

The bounding volume hierarchy builder 600 selects a "best" candidate subdivision for each level, based on one or more selection criteria. The selection criteria is any technically feasible value or set of values. In some examples, the selection criteria is a measure of the total surface area of the bounding boxes in the candidate subdivision. A lower total surface area is considered "better" because a lower surface area is associated with a better fit to the internal geometry. Thus in some examples, the bounding volume hierarchy builder 600 selects a candidate subdivision having bounding boxes that have the lowest total surface area of all candidate subdivisions for that level. In some examples, the candidate subdivisions define orientation for each bounding box. Thus for a particular level, candidate subdivisions with different orientations are possible. It is notable that the reduced number of orientation possibilities associated with quantization allows for exhaustive consideration of all possible orientations, where such consideration would not be possible with arbitrary, high fidelity orientation. Although a specific technique has been described, any technically feasible technique for generating a bounding box may be used.

In examples where the bounding volume hierarchy builder 600 modifies an already existing bounding volume hierarchy to include oriented bounding boxes, the bounding volume hierarchy builder 600 does this modification according to any technically feasible technique. In one example, the bounding volume hierarchy 600 examines each level, determining whether any particular bounding box is to be converted to an oriented bounding box based on a trade-off between the benefit in doing such conversion as compared with the cost of making such a conversion. In some examples, the benefit is given a benefit score and the cost is given a cost score. In various examples, any technically suitable features are used to determine the benefit score and the cost score. In some examples, the benefit score characterizes the improvement in traversal performance provided by the oriented bounding boxes and the cost characterizes the reduction in performance resulting from the additional data storage and processing required by the oriented bounding box.

In various examples, the bounding volume hierarchy builder 600 is software or firmware executing on the processor 102 or within the APD 116, or is a hardware module (e.g., circuit) within the processor 102 or APD 116. The bounding volume hierarchy builder 600 is implementable in any technically feasible manner.

There are a large number of ways to define the quantization space of rotations for oriented bounding boxes. Here, the "quantization space" is the number of possible rotations that any given oriented bounding box can have. In other words, for any particular quantization space, any given oriented bounding box can have one of the rotations defined by the quantization space, and not any other rotation.

There are multiple quantization spaces. In some examples, having multiple quantization spaces means that the BVH builder 600, in generating a BVH, first selects a quantization space from a defined set of quantization spaces, and then selections orientations for oriented bounding boxes of a BVH being built, where the selected orientations are all within the selected quantization space. In other examples, having multiple quantization spaces means that, for any given BVH builder 600, that BVH builder 600 is capable of using at most one quantization space, and selects orientations from that particular quantization space for its oriented bounding boxes. In yet other examples, the BVH builder 600 is capable of selecting from some but not all of the quantization spaces described herein. In still other examples, the BVH builder 600 is capable of selecting one quantization space for each BVH, meaning that each oriented bounding box in a given BVH can only have orientations from the selected quantization space, but the BVH builder 600 is capable of selecting from different quantization spaces for different BVHs. In some examples, this applies to top-level and bottom-level acceleration structures (e.g., bottom-level and top-level BVHs)—in other words, the BVH builder 600 is capable of selecting different quantization spaces for different bottom-level BVHs even where those different bottom-level BVHs are pointed to by instance nodes of the same top-level BVH.

FIGS. 7A-7E illustrate aspects of example quantization spaces. These quantization spaces are based on platonic solids. Platonic solids are convex, regular polyhedrons in three-dimensional Euclidean space. The faces of such solids are identical in shape and size and all angles and edges are congruent. In addition, the same number of faces meet at each vertex.

Each quantization space is defined by at least one platonic solid. In some examples, a platonic solid defines multiple quantization spaces. The quantization space defines a number of possible orientations, where each orientation is defined by at least one vector whose origin is at the center of the platonic solid and the vector extends to a termination point defined by the platonic solid. In some examples, the termination point is a vertex of the platonic solid. In some examples, the termination point is a center of a face of the platonic solid. In some examples, each face of a platonic solid defines a number of child faces (e.g., the face is "tessellated"). In such examples, each such child face represents an equal subdivision of the face. In such examples, the vertices defined by such faces, the midpoints of the edges of such faces, and/or the midpoints of such faces are termination points of the orientations. In some examples, the faces are subdivided recursively, such that each face that is subdivided generates additional faces, which are subdivided, and so on. In some examples, the termination points include midpoints of any of the edges of the faces of the platonic solid (or of such subdivided faces).

In some examples, a quantization space is defined as the union of all vectors that begin at the center of the platonic solid and terminate at one of the mentioned termination points described above. In some examples, a quantization space is constructed from a set that does not include all such types of termination points, but includes one or more such types of termination points (where the types include the vertices, face midpoints, and edge midpoints of either the non-subdivided platonic solid or a subdivided platonic solid). In an example, a quantization space includes vectors that extend from the center of a platonic solid to all vertices of the non-subdivided platonic solid. In another example, a quantization space includes vectors that extend from the center of a platonic solid to all vertices of the non-subdivided platonic solid and to all edge midpoints of the non-subdivided platonic solid. In yet another example, a quantization space includes vectors that extend from the center to all vertices, all edge midpoints, and all face midpoints of the non-subdivided platonic solid and of a platonic solid subdivided one time. As can be seen, various examples of quantization spaces are described and any quantization space can be defined in relation to any particular platonic solid in a manner described herein. The orientations defined using a quantization space define the orientation of the oriented bounding boxes.

The platonic solids include the tetrahedron (four faces), the cube (six), the octahedron (eight), the dodecahedron (twelve), and the icosahedron (twenty). FIGS. 7A-7E each illustrate aspects of a different one of these platonic solids.

Figures 7A, 7B, 7C, 7D, 7E:
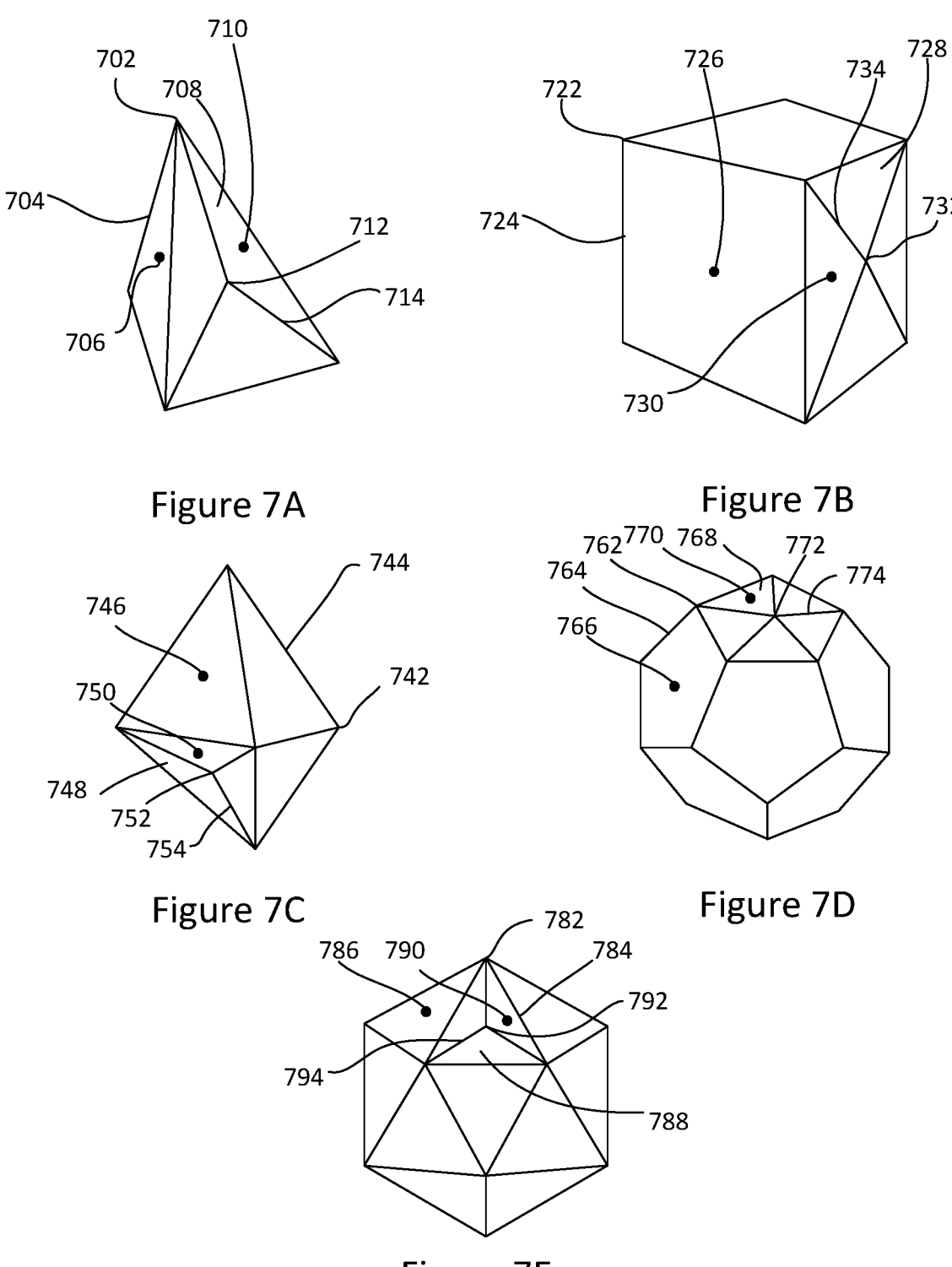
FIGS. 7A-7E illustrate example platonic solids for quantizing oriented bounding boxes.

FIG. 7A illustrates aspects of a tetrahedron that is used to generate a quantization space. Specifically, FIG. 7A illustrates tetrahedron vertices 702, edge midpoints 704, face midpoints 706, subdivided faces 708, subdivided face midpoints (midpoints of the subdivided faces) 710, subdivided face vertices 712, and subdivided face edge midpoints 714. Although not all of these feature of the tetrahedron are provided with reference numerals, it should be understood that the various terms used for a given type of geometry feature (e.g., vertex or face midpoint) refer to all such features of that type of the particular platonic solid (the tetrahedron in FIG. 7A).

FIG. 7B illustrates similar features for a cube, including cube vertices 722, cube edge midpoints 724, cube face midpoints 726, cube face subdivisions 728, cube face subdivision midpoints 730, cube face subdivision vertices 732, and cube face subdivision edge midpoints 734. FIG. 7C illustrates similar features for an octahedron, including octahedron vertices 742, octahedron edge midpoints 744, octahedron face midpoints 746, octahedron face subdivisions 748, octahedron face subdivision midpoints 750, octahedron face subdivision vertices 752, and octahedron face subdivision edge midpoints 754. FIG. 7D illustrates similar features for a dodecahedron, including dodecahedron vertices 762, dodecahedron edge midpoints 764, dodecahedron face midpoints 766, dodecahedron face subdivisions 768, dodecahedron face subdivision midpoints 770, dodecahedron face subdivision vertices 772, and octahedron face subdivision edge midpoints 774. FIG. 7E illustrates similar features for an icosahedron, including icosahedron vertices 782, icosahedron edge midpoints 784, icosahedron face midpoints 786, icosahedron face subdivisions 788, icosahedron face subdivision midpoints 790, icosahedron face subdivision vertices 792, and icosahedron face subdivision edge midpoints 794.

As stated above, any given quantization space includes a collection of vectors (directions) that correspond to one or more features of one or more platonic solids. Example "features" include those described with respect to FIGS. 7A-7E, including the vertices, edge midpoints, face midpoints, face subdivision midpoints, face subdivision vertices, and face subdivision edge midpoints. Although only one level of subdivision is shown, it should be understood that subdivided faces can be further subdivided. A vector that corresponds to a feature means that the vector has an origin at the center of the platonic solid and passes through the feature. A quantization space can include vectors corresponding to any combination of features of any combination of platonic solids.

As stated above, the oriented bounding boxes represent the orientation of a bounding box. It is possible to specify an orientation using multiple vectors that are within a quantization space. More specifically, in some examples, an orientation defines rotation directions in one, two, or three dimensions (e.g., pitch, roll, and yaw, or x, y, and z). Thus it is possible to use one, two or three vectors of a quantization space, where each such vector specifies the rotation in one of a particular dimension, to specify an orientation for an oriented bounding box. In an example, a first selected vector of a quantization space specifies the rotation in the x direction, a second selected vector of a quantization space specifies the rotation in the y direction, and a third selected vector of a quantization space specifies the rotation in the z direction.

In some examples, the BVH builder 600, in building a BVH, provides orientations for oriented bounding boxes of a BVH using an index to a lookup table. In other words, each oriented bounding box has an index into a lookup table. The lookup table includes a plurality of entries, each of which defines an orientation (e.g., one, two, or three rotations). As described above, each rotation in each such orientation has a relationship to a platonic solid. The lookup table thus defines a set of orientations that are defined relative to one or more platonic solid. Again, the orientations in that set are from one or more features of one or more platonic solids. In some examples, the BVH builder 600 generates multiple different BVHs, over time, from a fixed quantization space that does not vary for such different BVHs. In an example, the BVH builder 600 generates or updates a BVH for each frame of a set of different frames, with the same, fixed quantization space. In other examples, the BVH builder 600 varies the quantization space for each new BVH generated or at any other frequency.

Figure 8:
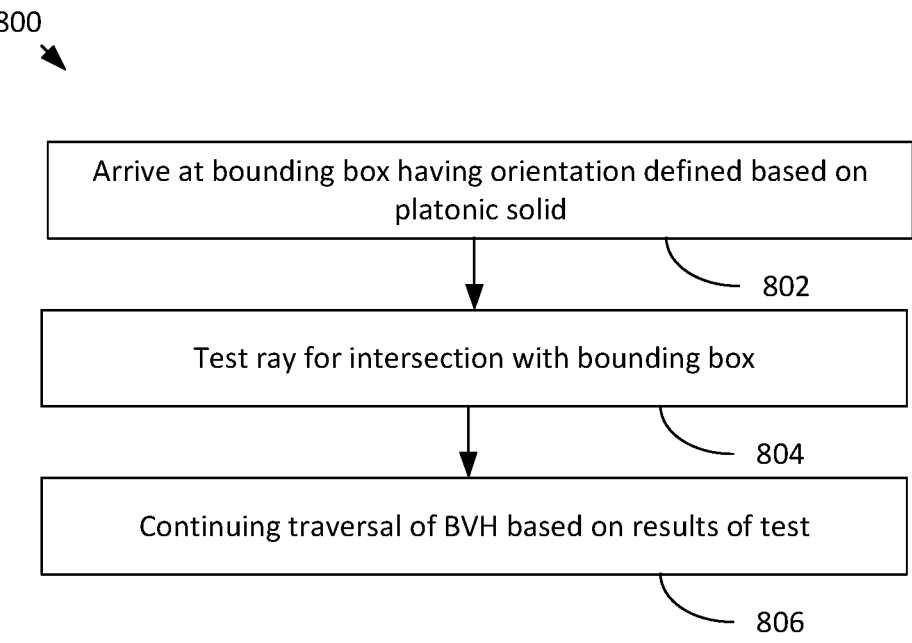
FIG. 8 is a flow diagram of a method for performing ray tracing with a bounding volume hierarchy having an oriented bounding box with an orientation defined with respect to a platonic solid, according to an example.

FIG. 8 is a flow diagram of a method 800 for performing ray tracing with a bounding volume hierarchy having an oriented bounding box with an orientation defined with respect to a platonic solid, according to an example. Although described with respect to the system of FIGS. 1-7E, those of skill in the art will understand that any system configured to perform the steps of the method 800 in any technically feasible order falls within the scope of the present disclosure.

At step 802, the ray tracing pipeline 300 arrives at a bounding box that has an orientation that is defined based on a platonic solid. The bounding box having an orientation means that the bounding box is rotated in one or more axes with respect to the coordinates space of the bounding volume hierarchy (e.g., the coordinate space of the root node or of unrotated bounding boxes in the BVH). The orientation being defined based on a platonic solid means that the orientation includes one or more rotations that are within one or more quantization spaces defined relative to one or more platonic solids, as described elsewhere herein.

At step 804, the ray tracing pipeline 300 tests a ray for intersection against the arrived at oriented bounding box. In some examples, testing the ray for intersection includes rotating the ray based on the orientation of the bounding box and testing whether any portion of the ray is within the bounding box. As rotating the ray is mathematically equivalent to, and simpler than, rotating the bounding box to the coordinate system of the ray, it can be considered advantageous to rotate the ray instead of the box. With the rotated ray, the ray tracing pipeline 300 tests that ray for intersection with the bounding box.

At step 806, the ray tracing pipeline 300 continues traversal of the BVH based on the results of the test for intersection. In the event that the ray tracing pipeline 300 determines that the ray does not intersect the oriented bounding box, then the ray tracing pipeline 300 continues with other portions of the BVH, if there are any such portions remaining to be evaluated. In the event that the ray tracing pipeline 300 determines that the ray does intersect the oriented bounding box, then the ray tracing pipeline 300 traverses to the children of the oriented bounding box, testing those children and/or any other portions of the BVH available for testing.

Herein, when it is stated that the ray tracing pipeline 300 performs an action, this should be understood to mean that the appropriate part of the ray tracing pipeline 300 (e.g., one of the illustrated components of the ray tracing pipeline 300), implemented as hardware (e.g., circuitry, such as any type of processor), software, or a combination thereof, performs that action.

In some examples, in addition to traversing the BVH including the oriented bounding box, an entity such as the driver 122, a shader program executing on the APD 116, a specially configured circuit, the processor 102, or any other processor or circuit, builds the BVH as described elsewhere herein (e.g., in FIG. 6). In some examples, the entity builds the BVH for each frame, or according to some other timing, and traverse the BVH for multiple rays to render a scene for each frame, where the BVH includes at least one oriented bounding box as described herein.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the compute units 132, the SIMD units 138, the ray tracing pipeline 300, including the ray generation shader 302, the ray intersection test unit 304, the any hit shader 306, the hit or miss unit 308, the closest hit shader 310, the miss shader 312, or the bounding volume hierarchy builder 600 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system for performing ray tracing operations, the system comprising:

a memory configured to store data for a bounding volume hierarchy ("BVH"); and a processor configured to:

arrive at a bounding box of the BVH, the bounding box having an orientation that is not axis aligned and that is defined based on a platonic solid, wherein the orientation is selected based on a vector extending from a center of the platonic solid to a face, a child face, a vertex, an edge midpoint, or a face midpoint of the platonic solid;

test a ray for intersection with the bounding box; and
    continue traversal of the BVH based on results of the
      testing.

2. The system of claim 1, wherein each oriented bounding
box of the BVH has an orientation that is based on a
quantization space.

3. The system of claim 1, wherein the orientation includes
a plurality of directions, each of which is within a quanti-
zation space.

4. The system of claim 1, wherein the orientation includes
a first direction within a quantization space and two direc-
tions that are perpendicular to the first direction.

5. The system of claim 1, wherein the processor is further
configured to build the BVH by selecting orientations based
on a quantization space for each oriented bounding box of
the BVH.

6. The system of claim 1, wherein the platonic solid
includes one of a regular tetrahedron, a cube, a regular
octahedron, a regular dodecahedron, or a regular icosahe-
dron.

7. A non-transitory computer-readable medium storing
instructions that, when executed by a processor, cause the
processor to perform operations comprising:

arriving at a bounding box of a bounding volume hierar-
      chy ("BVH"), the bounding box having an orientation
      that is not axis aligned and that is defined based on a
      platonic solid, wherein the orientation is selected based
      on a vector extending from a center of the platonic solid
      to a face, a child face, a vertex, an edge midpoint, or a
      face midpoint of the platonic solid;

testing a ray for intersection with the bounding box; and
    continuing traversal of the BVH based on results of the
      testing.

8. The non-transitory computer-readable medium of claim
7, wherein each oriented bounding box of the BVH has an
orientation that is based on a quantization space.

9. The non-transitory computer-readable medium of claim
7, wherein the orientation includes a plurality of directions,
each of which is within a quantization space.

10. The non-transitory computer-readable medium of
claim 7, wherein the orientation includes a first direction within a quantization space and two directions that are
perpendicular to the first direction.

11. The non-transitory computer-readable medium of
claim 7, wherein the operations further comprise building
the BVH by selecting orientations based on a quantization
space for each oriented bounding box of the BVH.

12. The non-transitory computer-readable medium of
claim 7, wherein the platonic solid includes one of a regular
tetrahedron, a regular octahedron, a regular dodecahedron,
or a regular icosahedron.

13. A method for performing ray tracing operations, the
method comprising:

arriving at a bounding box of a bounding volume hierar-
      chy ("BVH"), the bounding box having an orientation
      that is not axis aligned and that is defined based on a
      platonic solid, wherein the orientation is selected based
      on a vector extending from a center of the platonic solid
      to a face, a child face, a vertex, an edge midpoint, or a
      face midpoint of the platonic solid;

testing a ray for intersection with the bounding box; and
    continuing traversal of the BVH based on results of the
      testing.

14. The method of claim 1, wherein each oriented bound-
ing box of the BVH has an orientation that is based on a
quantization space.

15. The method of claim 1, wherein the orientation
includes a plurality of directions, each of which is within a
quantization space.

16. The method of claim 1, wherein the orientation
includes a first direction within a quantization space and two
directions that are perpendicular to the first direction.

17. The method of claim 1, further comprising building
the BVH by selecting orientations based on a quantization
space for each oriented bounding box of the BVH.

18. The method of claim 13, wherein the platonic solid
includes one of a regular tetrahedron, a cube, a regular
octahedron, a regular dodecahedron, or a regular icosahe-
dron.

* * * * *